United States Patent Office 2,859,324
Patented Nov. 4, 1958

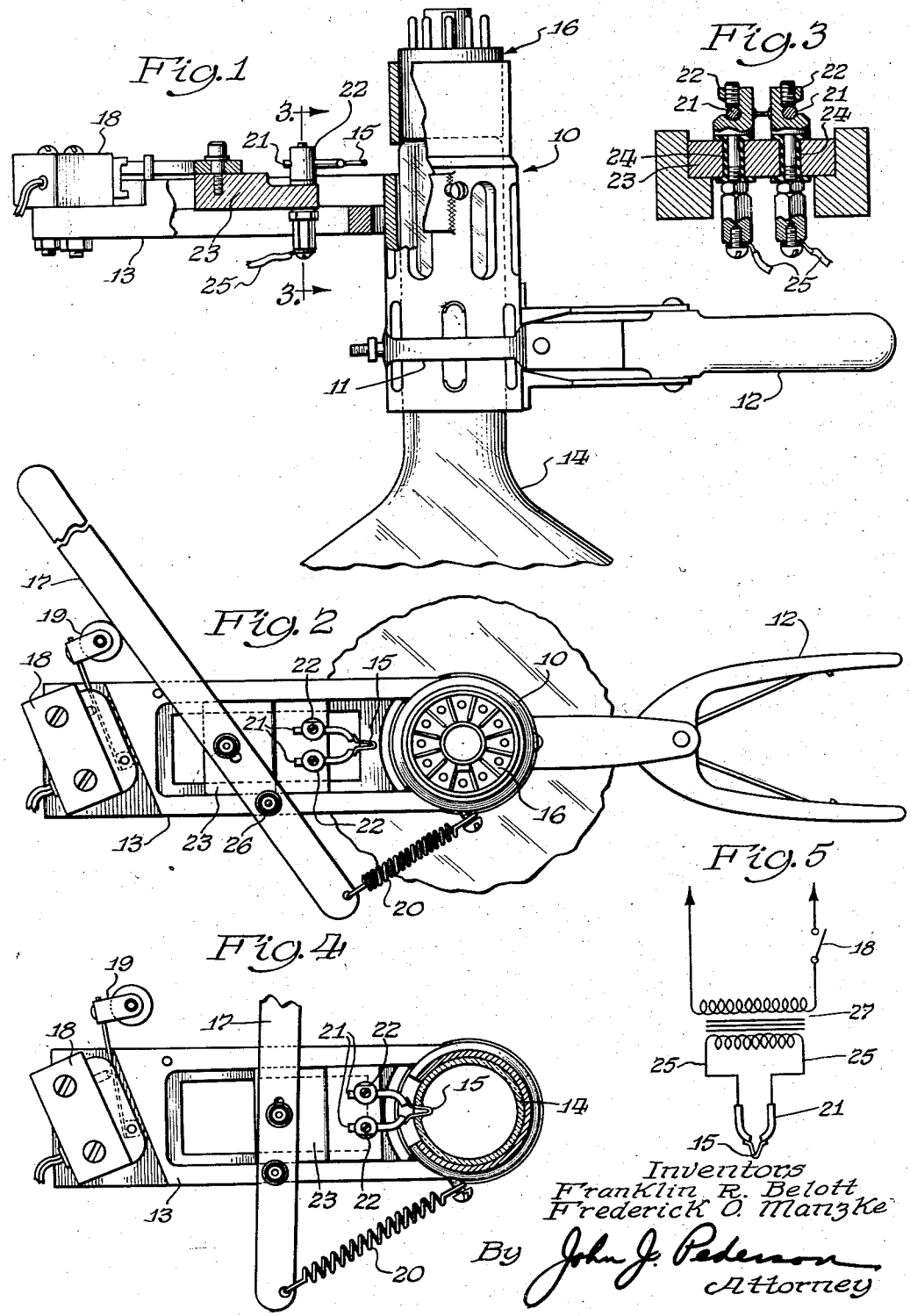

2,859,324

ELECTRON-DISCHARGE DEVICE PROCESSING APPARATUS

Franklin R. Belott and Frederick O. Manzke, Chicago, Ill., assignors to The Rauland Corporation, a corporation of Illinois Application December 27, 1957, Serial No. 705,570

4 Claims. (Cl. 219—19)

This invention relates to a novel apparatus for piercing vitrous material such as glass while it is in a form enclosing a high vacuum. It is useful in any application in which it becomes necessary to relieve the vacuum from an evacuated enclosure with a minimum of hazard and without mechanical damage to the interior of the enclosure. Since it is particularly useful in connection with the manufacture of cathode-ray tubes, the description of the invention will be directed to an application of this type.

Conventional cathode-ray tubes comprise a substantially evacuated envelope enclosing a luminescent screen and an electron gun for producing and accelerating an electron beam toward the luminescent screen which is disposed upon the inside end surface of such envelope. In normal manufacturing operations, it frequently becomes necessary to open the evacuated enclosure for various reasons. If carefully done, the electron gun can be removed and the glass envelope or enclosure be re-used, resulting in a considerable monetary saving. In some instances, the luminescent screen itself may be salvaged with the same result. Existing methods of removing the neck, however, frequently result in the creation of small chips adjacent to the cut or broken area, which chips enter the glass enclosure at extremely high velocity due to the accelerating effect of the external atmospheric pressure. These small glass particles, propelled at high velocity inside the glass enclosure, damage the luminescent screen beyond re-use and frequently scratch or damage the inside viewing surface itself, making the envelope unfit for re-use or salvage.

It is a principal object of this invention, therefore, to provide a new and improved apparatus for relieving the vacuum inside a substantially exhausted envelope.

It is a further object of this invention to provide such an apparatus for achieving this result while reducing or eliminating damage to the interior surfaces of such envelopes arising from rapidly accelerated particles of glass.

Yet another object of the invention is to provide new and improved apparatus for relieving the vacuum in an evacuated envelope, which apparatus is economical to construct and adapted to safe and efficient use in the commerical manufacture of cathode-ray tubes on a mass production basis.

The features of this invention, which are believed to be new, are set forth with particularity in the claims. The invention itself, however, together with further objects and advantages thereof, may best be understood by reference to the following description, when taken in conjunction with the accompanying drawings, in the several figures of which like reference numerals indicate like elements, and in which:

Figure 1 is a side view of one embodiment, partially in section, of a glass puncturing apparatus embodying the invention and mounted on the neck portion of a cathode-ray tube;

Figure 2 is a top plan view of the apparatus of Figure 1;

Figure 3 is a cross-sectional view taken along line 3—3 of Figure 1, but with some components of the apparatus omitted to simplify this view;

Figure 4 is a top plan view similar to that of Figure 2, but with some of the components omitted to simplify this view, and shown in an alternate position; and Figure 5 is a schematic diagram of suitable electrical circuitry for energizing this embodiment of the apparatus.

The apparatus shown in Figures 1 and 2 comprises a holding fixture embodying the invention installed in its operative position on the neck of a cathode-ray tube. A metal sleeve 10 having a chuck type clamp 11 operated by a hand lever 12 to which the neck puncturing apparatus 13 is attached or welded is shown at a predetermined operating position on the neck of a cathode-ray tube 14.

The apparatus is provided with a self-supporting electrically conductive element having a restricted area tip portion 15, suitably braced or bonded to a pair of rigid electrically insulated binding posts 22, which in turn are insulatingly mounted on a sliding block 23. Sliding block 23 is equipped with a lever arm 17, which pivots around a pin 26 and is used as a means for moving restricted area tip portion 15 into contact with the neck portion of cathode-ray tube envelope 14. Lever arm 17 is equipped with a spring 20 which holds restricted area tip portion 15 away from contact with cathode-ray tube envelope 14; when lever arm 17 is in the neutral position, shown in Figure 2, it engages the roller arm 19 of a microswitch 18 to maintain switch 18 in an open circuit condition.

Figure 3 shows in greater detail insulating bushings 24 used to insulate binding posts 22 from sliding block 23, as well as means for attaching wires 25 to binding posts 22.

Figure 4 comprises the holding fixture embodying the invention shown in an alternate or operated position with restricted area tip portion 15 shown piercing the neck portion of the cathode-ray tube 14. In the position shown, lever arm 17 is disengaged from contact with roller arm 19 of switch 18, thereby causing switch 18 to be in an electrically closed position.

Figure 5 shows schematically a suitable method of attaching the restricted area tip portion 15 with its rigid electrically conductive mounting arms 21 through connecting wires 25 to a suitable electric current transforming device 27, which in turn is connected to the electric current mains or other suitable power source (not shown).

In operation, the apparatus shown in Figures 1 and 2 is positioned on the neck of a cathode-ray tube 14 with the restricted area tip portion 15 adjacent but slightly spaced from the glass surface of the cathode-ray tube neck at a point slightly below tube base 16. Lever arm 17 is moved toward the right as shown in Figure 4, to a point where roller arm 19 disengages from lever arm 17, thereby closing switch 18, and causing current to flow through the restricted area tip portion 15. Preferably, the switch is not closed to heat tip 15 until the tip is at or near a position of actual contact with the glass neck; thus, the glass serves to inhibit the access of oxygen from the atmosphere to the incandescent metal, preventing rapid deterioration of the tip. As tip portion 15 is heated to a point above the fusing temperature of the glass neck of cathode-ray tube 14, the glass is softened locally in the area of contact with the restricted area tip portion. Sufficient pressure is continuously applied to lever arm 17 to urge or press the tip portion through the locally softened area, thereby permitting gradual access of air from the surrounding atmosphere to the interior of the substantially exhausted cathode-ray tube envelope.

The conductive material used to form the restricted area tip portion must be capable of maintaining sufficient rigidity to be forced through the locally softened vitrous material. It should also be a material which when heated to the point of incandescence still maintains rigidity and at the same time is thermally inert, i. e., resists rapid oxidation. It should also possess the ability to be bent, formed, or shaped with sharp radii without structural failure. It has been found that a material composed of a molybdenum base with a platinum surface coating of a total approximate diameter of .027 inch is entirely suitable for use in the described apparatus; of course, other materials possessing the above properties may be substituted. It has further been found that when a tip 15 constructed of such material is caused to electrically conduct a current of approximately 30 amperes alternating current, sufficient incandescence is achieved to bring a local area of the glass cathode-ray tube envelope to a molten condition. It has further been found that the urging of tip portion 15 against the envelope causes the glass to be pierced without creating small chips or broken pieces of glass in the vicinity of the pierced area; consequently, there is no damage to the fluorescent screen or the interior of the envelope from flying bits of glass as often encountered in the use of prior art techniques. The disclosed apparatus further reduces the hazard previously existing in that it permits the slow entrance of air to the substantially exhausted enclosure, thereby minimizing the likelihood of violent fracture.

While a particular embodiment of the present invention has been shown and described, it will be obvious to those skilled in the art that modifications may be made, without departing from this invention in its broader aspects, and it is intended in the appended claims to cover all such modifications as may fall within the true spirit and scope of the invention.

We claim:
1. Apparatus for relieving the vacuum in an evacuated envelope of vitrous material such as employed in the construction of cathode-ray tubes and other electron discharge devices comprising: a self-supporting electrically conductive element having a restricted area tip portion adapted to contact said envelope; means for passing electric current through said element to raise its temperature above the fusing temperature of such vitrous material; and means for urging said tip portion under pressure against said envelope whereby said envelope is locally softened at the area of contact with said tip portion, and with continued urging of said tip portion against said contact area, said envelope is pierced by said tip portion to provide gradual access for air from the surrounding atmosphere to the interior of such envelope.

2. Apparatus according to claim 1, in which said means for passing electric current through said conductive element includes a switch and in which said means for urging said tip portion against said envelope includes a switch operating member for closing said switch to heat said conductive element upon contact of said tip portion with said envelope.

3. Apparatus according to claim 1, in which said conductive element is formed as a substantially U-shaped wire probe with the bight portion of such probe constituting said tip portion of said conductive element.

4. Apparatus according to claim 1, in which said conductive element is constituted of a thermally inert incandescible metal.

References Cited in the file of this patent
UNITED STATES PATENTS

| | | |
|---|---|---|
| 756,935 | Burrows | Apr. 12, 1904 |
| 2,304,714 | Stringer | Dec. 8, 1942 |
| 2,485,769 | Phelps | Oct. 25, 1949 |
| 2,703,746 | Colt | Mar. 8, 1955 |